(12) United States Patent
Lai et al.

(10) Patent No.: US 9,804,799 B2
(45) Date of Patent: Oct. 31, 2017

(54) MEMORY STORAGE DEVICE AND OPERATING METHOD THEREOF

(71) Applicant: SK hynix Inc., Gyeonggi-do (KR)

(72) Inventors: Ching-Chung Lai, Hsinchu County (TW); Lian-Chun Lee, Hsinchu County (TW)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/279,169

(22) Filed: Sep. 28, 2016

(65) Prior Publication Data

US 2017/0168754 A1 Jun. 15, 2017

(30) Foreign Application Priority Data

Dec. 14, 2015 (TW) .............................. 104141992 A (51) Int. Cl.
*G11C 11/34* (2006.01)
*G06F 3/06* (2006.01)

(52) U.S. Cl.
CPC .......... *G06F 3/0656* (2013.01); *G06F 3/0604* (2013.01); *G06F 3/0683* (2013.01)

(58) Field of Classification Search
CPC ................................. G11C 7/10; G11C 7/103
USPC ............. 365/185.12, 189.14, 185.03, 230.08
See application file for complete search history.

(56) References Cited

U.S. PATENT DOCUMENTS

| 2007/0088903 A1* | 4/2007 | Choi ........................ G11C 5/04 711/100 |
| 2010/0318839 A1* | 12/2010 | Avila .................. G06F 12/0802 714/5.11 |
| 2013/0138870 A1 | 5/2013 | Yoon et al. |
| 2017/0038969 A1 | 2/2017 | Choi et al. |

* cited by examiner

*Primary Examiner* — Han Yang
(74) *Attorney, Agent, or Firm* — IP & T Group LLP (57) ABSTRACT

Disclosed are a memory storage device and an operating method thereof. The operating method writes data to a plurality of memory devices of the memory storage device through a controller, and performs interleaving programming on the plurality of memory devices. The operating method includes a write request step, a read request step, a page temporary storage area write step, and a device switching step, which are repeated until the respective memory devices complete the above-described steps and a page temporary storage area programming step. Before the page temporary storage area programming step is performed, data transmitted to page temporary storage areas of the respective memory devices are temporarily stored in the page temporary storage areas. Thus, the number of SRAMs can be reduced, and a programming operation can be performed on a plurality of memory devices at the same time.

12 Claims, 5 Drawing Sheets

MEMORY STORAGE DEVICE AND OPERATING METHOD THEREOF

CROSS-REFERENCES TO RELATED APPLICATION

The present application claims priority under 35 U.S.C. §119(a) to Taiwan application number 104141992, filed on Dec. 14, 2015, in the Taiwan Intellectual Property Office, which is incorporated herein by reference in its entirety.

BACKGROUND

1. Technical Field

Various embodiments relate generally to a semiconductor device and an operating, method thereof, and more particularly, to a memory storage device and an operating method thereof.

2. Related Art

Recently, the market for digital cameras, smart phones and MP3 players has rapidly grown, and the demand for storage media of consumers has also rapidly increased. A nonvolatile memory device retains data stored therein even after blackout, and has a small volume while saving power. Thus, the nonvolatile memory device can be properly applied to portable products. For example, an embedded Multi-Media Card (eMMC) is a storage device using a NAND flash memory as a storage medium.

The flash memory storage device typically includes one controller and a plurality of flash memory wafers (or devices). According to the characteristics of the flash memory, the flash memory consumes a larger amount of time in performing a program operation than in performing a read operation. When any one flash memory device is performing a program operation through memory interleaving in order to improve the write speed and the performance of garbage collection in the background, the controller may be switched to another flash memory device in order to control the flash memory device. Thus, the overall operation time can be reduced. However, in order to accomplish a substantial operating time reduction, the number of static random access memories (SRAMs) arranged in the controller must be increased. Since the cost of SRAM is relatively high, consumers generally want to reduce the use of SRAM. Furthermore, according to the characteristics of the flash memory, when a flash memory device performs a program operation, the flash memory device cannot be read at the same time. Thus, the storage time is inevitably extended.

SUMMARY

Various embodiments are directed to a memory storage device which is capable of reducing the number of SRAMs used therein and performing interleaving programming on a plurality of memory devices, and an operating method thereof.

Also, various embodiments are directed to a memory storage device which is capable of writing data to a page temporary storage area of a memory device through a controller, and performing a read operation on the memory device at the same time, before a page temporary storage area programming operation is performed, and an operating method thereof.

In an embodiment of the present disclosure, there is provided an operating method of a memory storage device including a plurality of memory devices, each having a page temporary storage area and a storage area, and a controller having a buffer area. The operating method may include: a write request step in which the controller receives a write request instruction of one memory device among the plurality of memory devices, and stores write data in the buffer area, according to the write request instruction; a read request step in which the controller receives a read request instruction of the one memory device among the plurality of memory devices, and transmits data which are intended to be read from the storage area of the one memory device, to the buffer area, according to the read request instruction; a page temporary storage area write step in which the controller performs a page temporary storage area write instruction, and transmits the data temporarily stored in the buffer area to the page temporary storage area of the one memory device; a repeating step in which the controller switches over to another memory device among the plurality of memory devices, and repeats the write request step, the read request step, and the page temporary storage area write step until the respective memory devices complete the write request step, the read request step, and the page temporary storage area write step; and a page temporary storage area programming step in which the controller performs a page temporary storage area programming instruction, and writes data of the page temporary storage areas of the respective memory devices to the storage areas of the respective memory devices. Before the page temporary storage area programming step is performed, the data transmitted to the page temporary storage areas of the respective memory devices may be temporarily stored in the page temporary storage areas.

The page temporary storage areas of the memory devices may include page temporary storage reserved areas and page temporary storage data areas, respectively. In the read request step, the data which are intended to be read may be first transmitted to the page temporary storage data areas of the respective memory devices, and then transmitted to the buffer area, and in the page temporary storage area write step, the data of the buffer area may be transmitted to the page temporary storage reserved area.

The page temporary storage area write step may be started after the storage space of the buffer area is full.

The storage area of each of the memory devices may include one of a single level cell (SLC), a multi-level cell (MLC), a triple level cell (TLC) and combinations thereof.

The memory device may include one of a flash memory, a ferroelectric random access memory (RAM), a magneto-resistive RAM, an electro-resistive RAM, a phase-change RAM and combinations thereof.

In an embodiment of the present disclosure, a memory storage device may include: a plurality of memory devices, each comprising a page temporary storage area and a storage area; and a controller comprising a buffer area. The controller may perform: a write request step in which the controller receives a write request instruction of one memory device among the plurality of memory devices, and stores write data in the buffer area, according to the write request instruction; a read request step in which the controller receives a read request instruction of the one memory device among the plurality of memory devices, and transmits data which are intended to be read from the storage area of the one memory device, to the buffer area, according to the read request instruction; a page temporary storage area write step in which the controller performs a page temporary storage area write instruction, and transmits the data temporarily stored in the buffer area to the page temporary storage area of the one memory device; a repeating step in which the controller switches over to another memory device among the plurality of memory devices, and repeats the write request step, the read request step, and the page temporary storage area write step until the respective memory devices complete the write request step, the read request step, and the page temporary storage area write step; and a page temporary storage area programming step in which the controller performs a page temporary storage area programming instruction, and writes data of the page temporary storage areas of the respective memory devices to the storage areas of the respective memory devices. Before the page temporary storage area programming step is performed, the data transmitted to the page temporary storage areas of the respective memory devices may be temporarily stored in the page temporary storage areas The page temporary storage areas of the memory devices may include page temporary storage reserved areas and page temporary storage data areas, respectively. The controller may first transmit data which are intended to be read from the storage areas of the respective memory devices, to the page temporary storage data areas of the respective memory devices, and then transmit the data to the buffer area. The controller may transmit data which are to be written to the corresponding memory device among the data of the buffer area, to the page temporary storage reserved areas.

The controller may include at least one static random access memory (SRAM) set as the buffer area.

The SRAM may correspond to two or more memory devices.

The buffer area may include a storage space having a size of two plane pages.

The storage area of each of the memory devices may include one of a single level cell (SLC), a multi-level cell (MLC), a triple level cell (TLC) and combinations thereof.

The memory device may include one of a flash memory, a ferroelectric random access memory (RAM), a magneto-resistive RAM, an electro-resistive RAM, a phase-change RAM and combinations thereof.

In the operating method according to the present embodiment, the controller may write data to a page temporary storage area of any one memory device, and still perform a read operation on the memory device before performing a page temporary storage area programming operation. In addition, the memory storage device and the operating method thereof can reduce the number of SRAMs used in the related art, and accomplish an effect of performing a programming operation on a plurality of memory devices at the same time.

BRIEF DESCRIPTION OF THE DRAWINGS

Features, aspects, and embodiments are described in conjunction with the attached drawings, in which.

DETAILED DESCRIPTION

Hereinafter, a memory storage device and an operating method thereof according to the present disclosure will be described below with reference to the accompanying drawings through exemplary embodiments.

Figure 1:
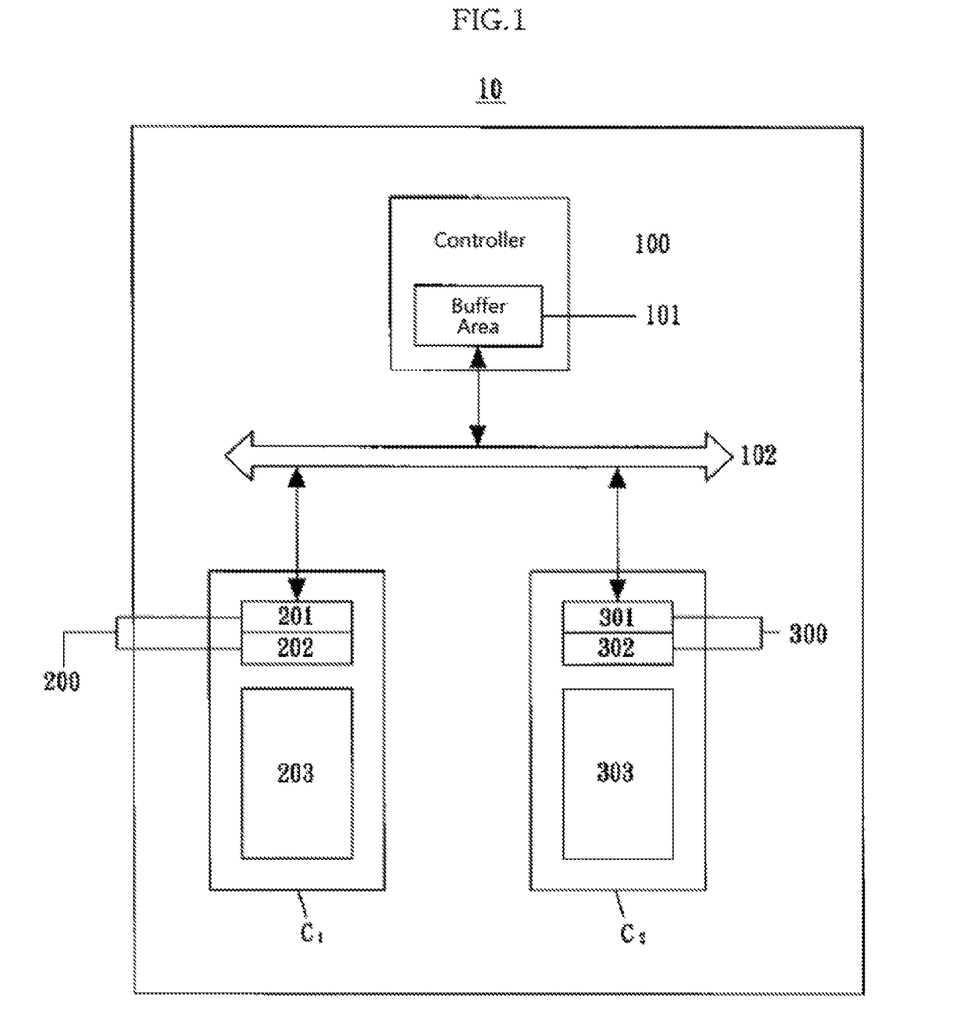
FIG. 1 is a diagram illustrating a memory storage device according to an embodiment.
Figure 2:
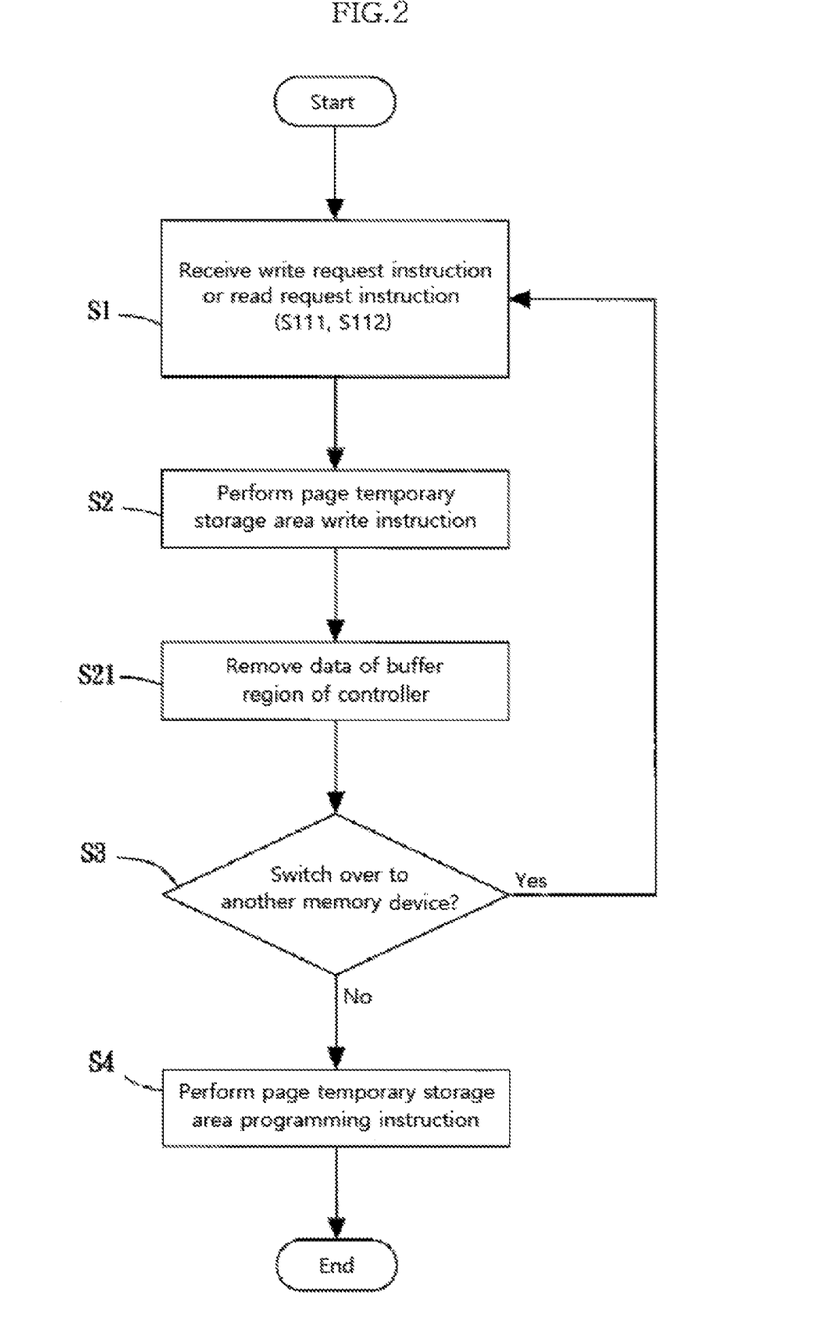
FIG. 2 is a flowchart illustrating an operating method of the memory storage device of FIG. 1.

FIG. 1 is a diagram illustrating a memory storage device according to an embodiment. FIG. 2 is a flowchart illustrating an operating method of the memory storage device of FIG. 1. Referring to FIGS. 1 and 2, the present embodiment may provide an operating method of a memory storage device 10. The memory storage device 10 may write data to two memory wafers (or devices) $C_1$ and $C_2$ thereof through a controller 100. The memory devices $C_1$ and $C_2$ may include page temporary storage areas 200 and 300 and storage areas 203 and 303, respectively. The controller 100 may include a buffer area 101.

The controller 100 may transmit data to the memory devices $C_1$ and $C_2$ through a common bus 102. The operating method may include a step S1, a page temporary storage area write step S2, a step S3, and a page temporary storage area programming step S4. The step S1 may include a read request step S111 and a write request step S112.

At the step S1, the controller 100 may receive and check a write request instruction or read request instruction to be performed. When data are to be read, the controller 100 may perform the step S111, while when data are to be written, the controller 100 may perform the step S112.

At the write request step S112, the controller 100 may receive a write request instruction for one memory device between the memory devices $C_1$ and $C_2$ from an external device (for example a host device), and store write data corresponding to the write request in the buffer area 101 according to the write request instruction. The operation may be sequentially performed on the respective memory devices, and started from $C_1$ in the embodiment of FIG. 1. However, the present embodiment may not limit the selection order of the memory devices $C_1$ and $C_2$. At the read request step S111, the controller 100 may receive a read request instruction for one memory device among the memory devices $C_1$ and $C_2$ from the external device, and transmit data which are intended to be read (hereinafter read data) from the storage area of the one memory device, to the buffer area 101 of the controller 100, according to the read request instruction. For example, when the read request instruction is for memory device C1 among the memory devices $C_1$ and $C_2$ from the external device, the controller 100 may transmit read data from the storage area 203 of the memory device C1, to the buffer area 101 of the controller 100, according to the read request instruction. At step S1, the controller 100 may receive both of a write request and a read request for one memory device, and then enter the next step S2. For example, while the controller 100 is performing step S1 for a first write request for the memory device C1, the controller may also receive a first read request for the memory device C1. The controller may then complete step S1 for both the first write request and the first read request for the memory device C1 before moving to the next step S2.

At the page temporary storage area write step S2, the controller 100 may perform the page temporary storage area write instruction, and transmit the data temporarily stored in the buffer area 101 to the page temporary storage area 200 of the one memory device $C_1$. When the next write data are received, the controller 100 may recopy data of the buffer area 101. Then, the controller 100 may enter the step S3 to determine whether there exist memory devices which have not passed through the above-described steps. When there exist memory devices which have not passed through the above-described steps (step S3, Yes), the controller 100 may return to the step S1. When there do not exist memory devices which have not passed through the above-described steps (step S3, No), the controller 100 may enter the step S4. At step S3, the controller 100 may switch over to the other memory device $C_2$ between the memory devices $C_1$ and $C_2$, and repeat the read request step S111 and/or the write request step S112 and the page temporary storage area write step S2, until both of the memory devices $C_1$ and $C_2$ complete the step S1, the step S111 and/or the step S112, and the page temporary storage area write step S2.

At the page temporary storage area programming step S4, the controller 100 may perform a page temporary storage area programming instruction to program the data of the page temporary storage areas 200 and 300 of the memory devices $C_1$ and $C_2$ to the storage areas 203 and 303 of the memory devices $C_1$ and $C_2$. In this case, before the page temporary storage area programming step S4 is performed, the data transmitted to the page temporary storage areas 200 and 300 of the respective memory devices $C_1$ and $C_2$ may be temporarily stored in the page temporary storage areas 200 and 300.

In the present embodiment, when data are transmitted to the page temporary storage areas 200 and 300 of the memory devices $C_1$ and $C_2$ from the buffer area 101 of the controller 100, the data may be programmed to the storage areas 203 and 303 of the memory devices $C_1$ and $C_2$ from the page temporary storage areas 200 and 300, only after the controller 100 performs the page temporary storage area programming instruction. This configuration may be distinguished from the configuration of the related art in which "data are transmitted to the page temporary storage areas of the memory devices from the buffer area of the controller and then immediately programmed to the storage areas of the memory devices". In the operating method according to the present embodiment, a memory device can immediately enter the read request step without waiting for a long programming busy time, after performing a page temporary storage area write operation. Only after write data are stored in the page temporary storage areas of all the memory devices, the data of the page temporary storage areas of the respective memory devices may be synchronized and written to the storage areas of the respective memory devices. Furthermore, the data area writing step capable of relatively saving time may be collectively performed to effectively reduce the overall storage time of the memory storage device. In the present embodiment, the two memory devices $C_1$ and $C_2$ are only an example In the above-described embodiment, the page temporary storage areas 200 and 300 of the respective memory devices $C_1$ and $C_2$ may include page temporary storage reserved areas 201 and 301 and page temporary storage data areas 202 and 302, respectively. Referring to FIGS. 1 and 2, data to be read may be first transmitted to the page temporary storage data areas 202 and 302 of the respective memory devices $C_1$ and $C_2$ and then transmitted to the buffer area 101 of the controller 100, at the read request step S111. The data of the buffer area 101 may be transmitted to the page temporary storage reserved areas 201 and 301 at the page temporary storage area write step S2. In the embodiment of FIG. 1, is only two memory devices $C_1$ and $C_2$ are illustrated as an example. In another embodiment, the memory storage device may include number of memory devices as illustrated in FIG. 3, wherein n may be an integer equal to or greater than two.

Figure 3:
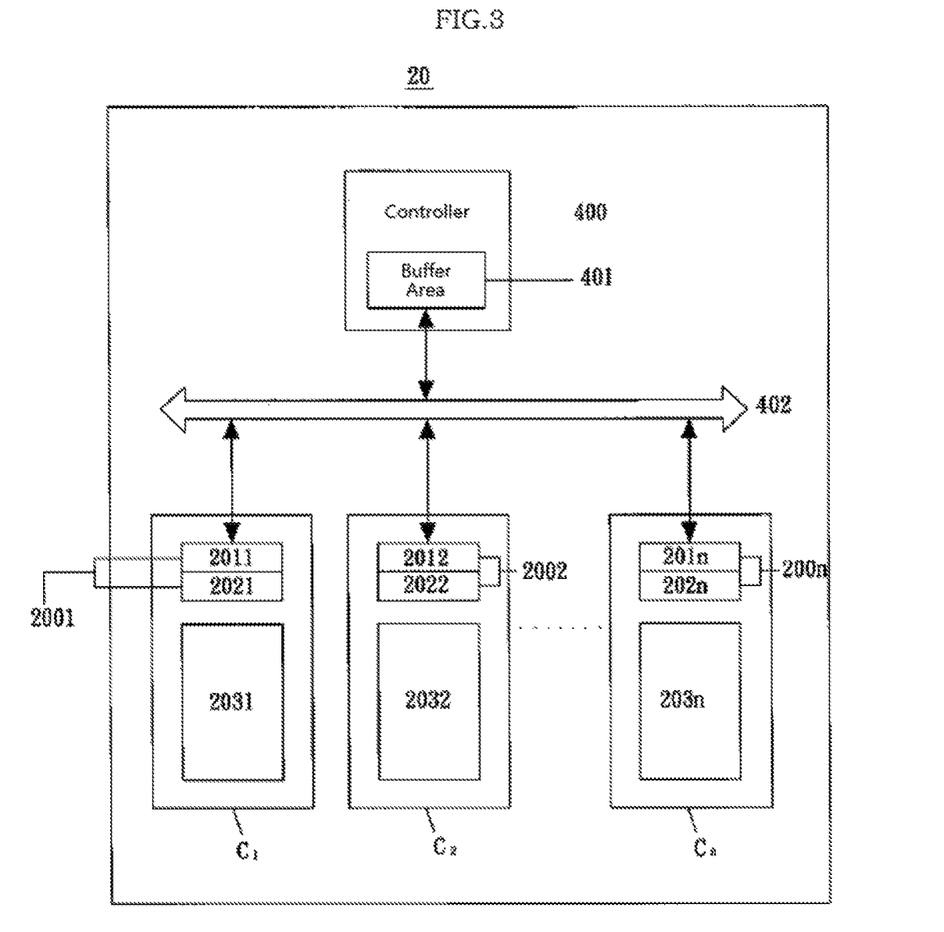
FIG. 3 is a diagram illustrating a memory storage device according to another embodiment.
Figure 4:
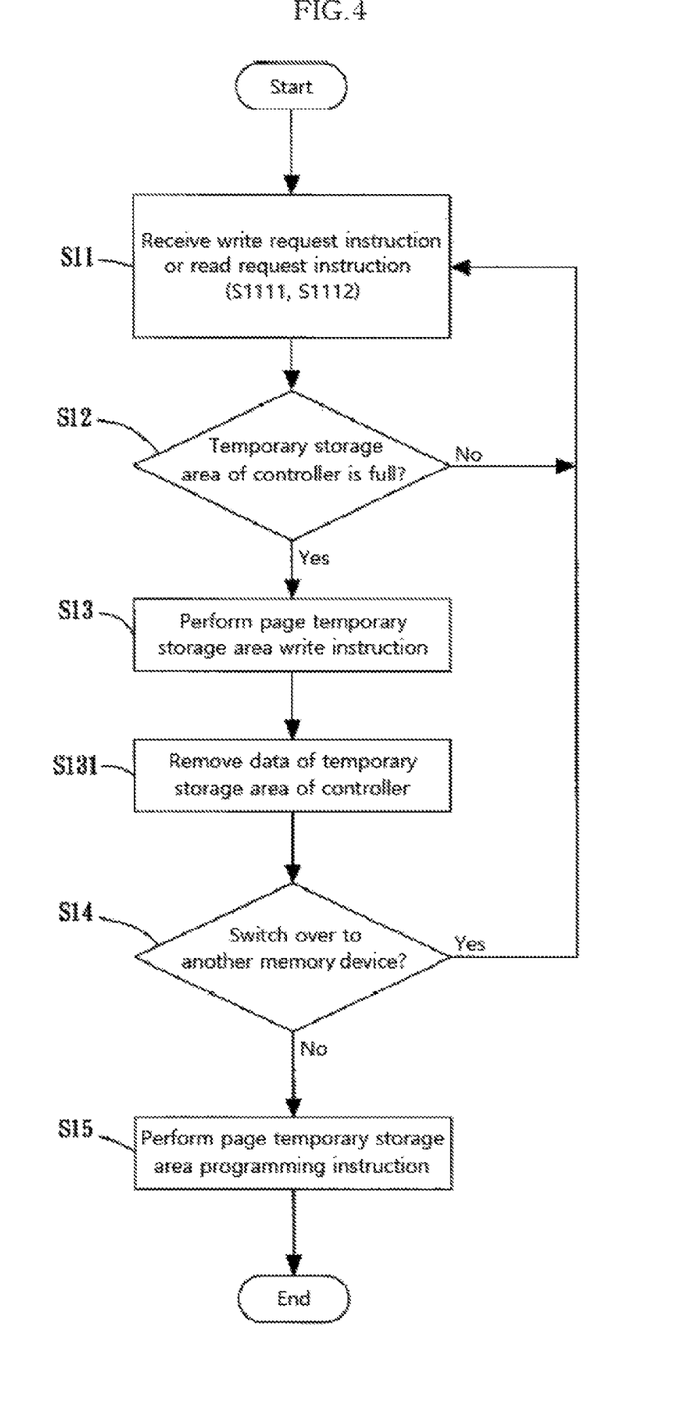
FIG. 4 is a flowchart illustrating an operating method of the memory storage device of FIG. 3.

FIG. 3 illustrates a memory storage, device 20 according to another embodiment. FIG. 4 is a flowchart illustrating an operating method of the memory storage device 20 of FIG. 3. In the embodiment of FIGS. 3 and 4, a page temporary storage area write step S13 is started after the storage space of the buffer area 401 of a controller 400 of FIG. 3 becomes full. Referring to FIGS. 3 and 4, considering that the storage space of the buffer area 401 of the controller 400 is full is only an example. That is, in a variation of this embodiment, the controller 400 may determine to perform the page temporary storage area write operation based on a controller algorithm even when the storage space of the buffer area 401 is not full.

As illustrated in FIG. 3, the operating method of the memory storage device 20 may write data to a plurality of memory devices $C_1$ to $C_n$ of the memory storage device 20 through the controller 400. The memory devices $C_1$ to $C_n$ may include page temporary storage areas 2001 to 200n and, storage areas 2031 to 203n, respectively. The (controller 400 may include a buffer area 401 and transmit data to the memory devices $C_1$ to $C_n$ through a common bus 402.

Referring to FIGS. 3 and 4, the operating method may include a step S11. The step S11 may include a read request step S1111 and or a write request step S1112. At step S11, the controller 400 receives a write request instruction for one memory device C1 among the memory devices $C_1$ to $C_n$ from an external device (for example, host) and stores the corresponding write data in the buffer area 401, according to the write request instruction corresponding to the step S1112. Further, at the step S11, the controller 400 receives a read request instruction for the one memory device $C_1$ among the memory devices $C_1$ to $C_n$ and transmits data which are intended to be read from the storage area 2031 of the one memory device $C_1$, to the buffer area 401 of the controller 400, according to the read request instruction corresponding to the step S1111.

At a step S12 of FIG. 4, the controller 400 determines whether the space of the buffer area 401 is full. When the space of the buffer area 401 is not full, the controller 400 repetitively receives a next write or read request instruction (corresponding to steps S1112 and S1111) for the C1 memory device. When the space of the buffer area 401 is full, the controller 400 enters the page temporary storage area write step S13. At the page temporary storage area write step S13, the controller 400 may perform the page temporary storage area write operation. As illustrated in FIG. 3, the data temporarily stored in the buffer area 401 may be controlled to be transmitted to the page temporary storage area 2001 of the one, memory device $C_1$.

At a step S14 of FIG. 4, the controller 400 may determine whether to switch over to another memory device $C_2$ among the memory devices $C_1$ to $C_n$, in order to switch over to the memory device. As stated earlier, the controller 400 will determine whether there exist any memory devices which have not completed the above steps. Hence, the controller 400 may repeat the read request step S1111 and/or the write request step S1112, the step S12 and the page temporary storage area write step S13, until the memory devices C1 to Cn complete the above steps.

Only, when there do not exist memory devices which have not passed through the above-described steps (step 14, No), the controller 400 may then immediately enter step S15. At step S15, the controller 400 may perform a page temporary storage area programming instruction to program the data of the page temporary storage areas 2001 and 200n of the memory devices $C_1$ to $C_n$ to the storage areas 2031 to 203n of the memory devices $C_1$ to $C_n$. Hence, before the page temporary storage area programming step S15 is performed, the data transmitted to the page temporary storage areas 2001 to 200n of the respective memory devices $C_1$ to $C_n$ are temporarily stored in the page temporary storage areas 2001 to 200n. In the present embodiment, the page temporary storage areas 2001 to 200n of the respective memory devices $C_1$ to $C_n$ may include page temporary storage reserved areas 2011 and 201n and page temporary storage data areas 2021 to 202n, respectively. Referring to FIGS. 3 and 4, data to be read may be first transmitted to the page temporary storage data areas 2021 to 202n of the memory devices $C_1$ to $C_n$, and then transmitted to the buffer area 401 of the controller 400, at the read request step S1111. The data of the buffer area 401 may be transmitted to the page temporary storage reserved areas 2011 to 201n at the page temporary storage area write step S13. At step S14, the memory devices $C_1$ to $C_n$ may be sequentially switched. In the present embodiment, however, the switching order of the memory devices $C_1$ to $C_n$ may not be limited.

In various embodiments, a storage area of a memory device may be selected from a single level cell (SLC), a multi-level cell (MLC), a triple level cell (TCL) or combinations thereof.

In various embodiments, a memory device may be selected from a NAND flash memory, a NOR flash memory, a ferroelectric random access memory (RAM), a magneto-resistive RAM, an electro-resistive RAM, a phase-change RAM or combinations thereof.

Figure 5:
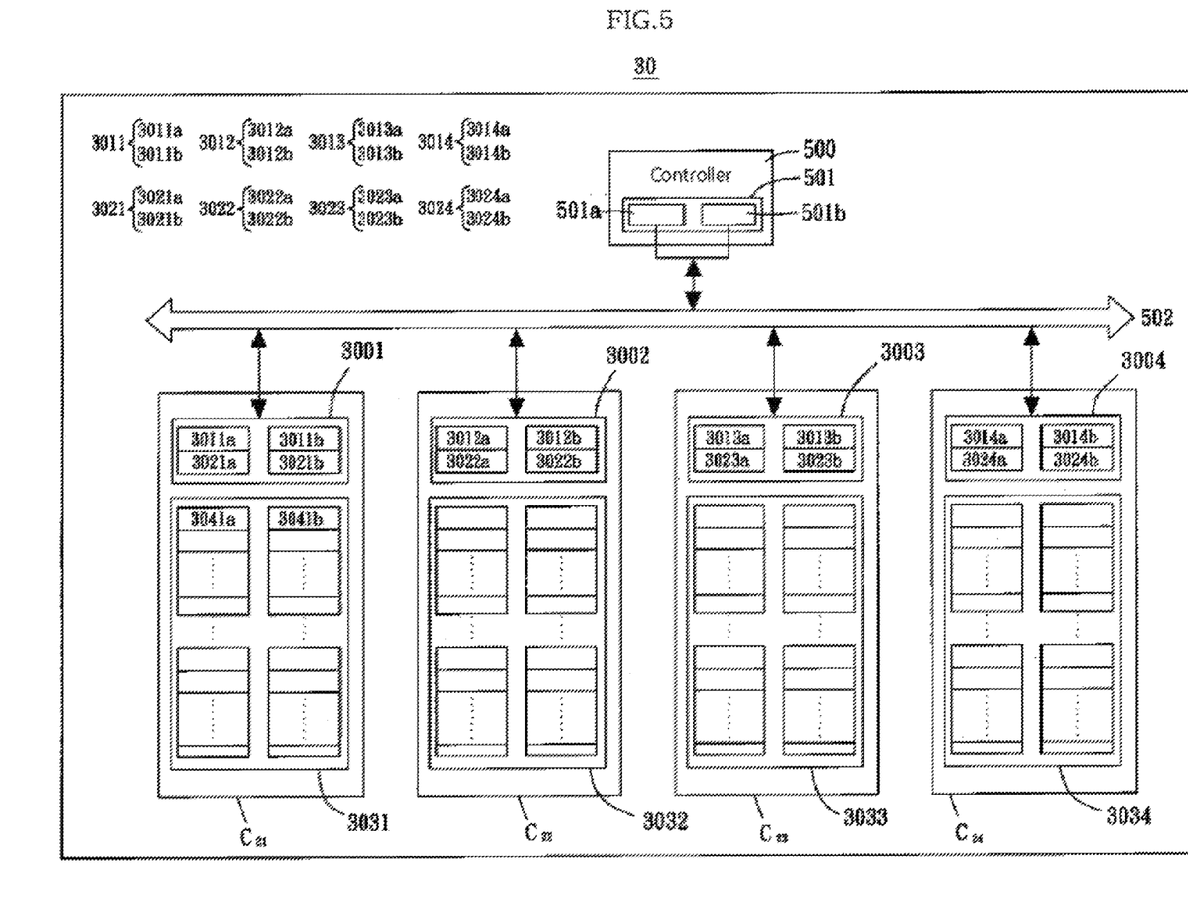
FIG. 5 is a diagram illustrating a memory storage device according to another embodiment.

FIG. 5 is a diagram illustrating a memory storage device according to another embodiment. Referring to FIG. 5, the memory storage device 30 according to the present embodiment may include four memory devices $C_{21}$ to $C_{24}$ and a controller 500. The memory devices $C_{21}$ to $C_{24}$ may include page temporary storage areas 3001 to 3004 and storage areas 3031 to 3034 respectively. The controller 500 may include a buffer area 501. The controller 500 may transmit data of the buffer area 501 to the memory devices $C_{21}$ to $C_{24}$ through a common bus 502 and the operating method of the memory storage device in FIG. 4 may be performed on the memory devices $C_{21}$ to $C_{24}$ through the controller 500.

Hereafter, the detailed structure and operating mechanism of the memory storage device 30 shown in FIG. 5 will be described.

Referring to FIG. 5, the number of static random access memories (SRAMs) as a buffer area 501 arranged in the controller 500 may include a primary maximum programming size of one or more memory devices. For example, when the controller 500 is intended to store data corresponding to a NAND flash memory device having a 3D MLC structure and four plane pages, the capacity of SRAM arranged in the controller 500 may be set to 64 KB in case where one page has a size of 8 KB.

In the present embodiment, SRAM as the buffer area having a size corresponding to two plane pages 501a and 501b will be taken as an example. As illustrated in FIG. 5, the page temporary storage areas 3001 to 3004 of the memory devices $C_{21}$ to $C_{24}$ may include page temporary storage reserved areas 3011 to 3014 and page temporary storage data areas 3021 to 3024, respectively. The controller 500 may transmit data which are intended to be read from the storage areas 3031 to 3034 of the respective memory devices $C_{21}$ to $C_{24}$, to the page temporary storage data areas 3021 to 3024 of the respective memory devices $C_{21}$ to $C_{24}$, and then transmit the data to the buffer area 501. Furthermore, the controller 500 may transmit data of the buffer area 501, which are to be written to the respective, memory devices $C_2$ to $C_{24}$, to the page temporary storage, reserved areas 3011 to 3014.

Referring to FIGS. 4 and 5, the controller 500 may first perform the write request step S1112 on the memory device $C_{21}$. That is, the controller 500 may receive a write request instruction for the memory device $C_{21}$, and store write data in the buffer area 501 of the controller 500. While the step S1112 is performed, the controller 500 may perform the read request step S1111 on another memory device $C_{23}$ at the same time. That is, the controller 500 may transmit data which are intended to be read from the storage area 3033 of the memory device $C_{23}$, to the page temporary storage data area 3023 of the memory device $C_{23}$, and then transmit the data to the buffer area 501 of the controller 500. At this time, when determining that the storage space of the buffer area 501 is already full (corresponding to the step S12), the controller 500 may perform the page temporary storage area write step S13 on the memory device $C_{21}$. That is, the controller 500 may perform a page temporary storage area write instruction. The controller 500 may transmit the data temporarily stored in the buffer area 501 to the page temporary storage reserved area 3011 of the memory device $C_{21}$, and perform a page temporary storage area write operation. Then, the controller 500 may immediately perform a read operation on the memory device $C_{21}$ without waiting for a long programming busy time. Then, the controller 500 may switch over to another memory device $C_{22}$ (corresponding to step S14), and receive data which are intended to be written to the memory device $C_{22}$. Until the four memory devices $C_{21}$ to $C_{24}$ complete the steps S1111, S1112, S12 and S13, the controller 500 may repeat the steps S1111, S1112, S12 and S13. In the present embodiment, the configuration in which the page temporary storage area write operation is performed after the space of the buffer area of the controller is full is only an example. As another example, the controller 500 may determine when to perform the page temporary storage area write operation other than when the buffer area based on an algorithm.

Then, the external device may wait for a page temporary storage area programming instruction which is to be given to the controller 500, and the controller 500 may perform a page temporary storage area programming step S15. The controller 500 may transmit the data of the page temporary storage reserved areas 3011 to 3014 of the memory devices $C_{21}$ to $C_{24}$ at the same time, and program the data to the storage areas 3031 to 3034 corresponding to the respective memory devices $C_{21}$ to $C_{24}$.

In the above-described embodiment, a storage area of a memory device may be selected from a single level cell (SLC), a multi-level cell (MLC), a triple level cell (TCL) or combinations thereof. In addition, a memory device may be selected from a NAND flash memory, a NOR flash memory, a ferroelectric RAM, a magneto-resistive RAM, an electro-resistive RAM, a phase-change RAM or combinations thereof.

Compared to the related art, the memory storage device according to the present embodiment can reduce the number of SRAMs used in the related art, and accomplish the effect of interleaving programming for a plurality of memory devices. In addition, the memory storage device and the operating method thereof according to the present embodiment may accomplish the effect that "the controller can perform a page temporary storage area write operation on any one memory device and then still perform a read operation on the memory device before performing a page temporary storage area programming operation", and effectively reduce the overall programming time for the plurality of memory devices.

While certain embodiments have been described above, it will be understood to those skilled in the art that the embodiments described are by way of example only. Accordingly, the memory storage device described herein should not be limited based on the described embodiments.

Rather, the memory storage device described herein should only be limited in light of the claims that follow when taken in conjunction with the above description and accompanying drawings.

What is claimed is:

1. An operating method of a memory storage device including a plurality of memory devices, each memory device having a page temporary storage area and a storage area, and a controller having a buffer area, the operating method comprising:
   a write request step in which the controller receives a write request instruction for one of the memory devices, and stores write data in the buffer area, according to the write request instruction;
   a read request step in which the controller receives a read request instruction for the one memory device, and transmits read data from the storage area of the one memory device to the buffer area, according to the read request instruction;
   a page temporary storage area write step in which the controller performs a page temporary storage area write instruction, and transmits the data temporarily stored in the buffer area to the page temporary storage area of the one memory device;
   a repeating step in which the controller switches over to another memory device among the plurality of memory devices, and repeats the write request step, the read request step, and the page temporary storage area write step until the memory devices complete the write request step, the read request step, and the page temporary storage area write step; and
   a page temporary storage area programming step in which the controller performs a page temporary storage area programming instruction, and writes data of the page temporary storage areas of the respective memory devices to the storage areas of the respective memory devices,
   wherein before the page temporary storage area programming step is performed, the data transmitted to the page temporary storage areas of the respective memory devices are temporarily stored in the page temporary storage areas.

2. The operating method according to claim 1, wherein the page temporary storage areas of the memory devices comprise page temporary storage reserved areas and page temporary storage data areas, respectively,
   wherein in the read request step, the data which are intended to be read are first transmitted to the page temporary storage data areas of the respective memory devices, and then transmitted to the buffer area, and
   in the page temporary storage area write step, the data of the buffer area are transmitted to the page temporary storage reserved area.

3. The operating method according to claim 2, wherein the page temporary storage area write step is started after the storage space of the buffer area is full.

4. The operating method according to claim 1, wherein the storage area of each of the memory devices includes one of a single level cell (SLC), a multi-level cell (MLC), a triple level cell (TLC) and combinations thereof.

5. The operating method according to claim 1, wherein the memory device includes one of a flash memory, a ferroelectric random access memory (RAM), a magneto-resistive RAM, an electro-resistive RAM, a phase-change RAM and combinations thereof.

6. A memory storage device comprising:
   a plurality of memory devices, each comprising a page temporary storage area and a storage area; and
   a controller comprising a buffer area,
   wherein the controller is suitable for performing:
   a write request step in which the controller receives a write request instruction of one memory device among the plurality of memory devices, and stores write data in the buffer area, according to the write request instruction;
   a read request step in which the controller receives a read request instruction of the one memory device among the plurality of memory devices, and transmits data which are intended to be read from the storage area of the one memory device, to the buffer area, according to the read request instruction;
   a page temporary storage area write step in which the controller performs a page temporary storage area write instruction, and transmits the data temporarily stored in the buffer area to the page temporary storage area of the one memory device;
   a repeating step in which the controller switches over to another memory device among the plurality of memory devices, and repeats the write request step, the read request step, and the page temporary storage area write step until the respective memory devices complete the write request step, the read request step, and the page temporary storage area write step; and
   a page temporary storage area programming step in which the controller performs a page temporary storage area programming instruction, and writes data of the page temporary storage areas of the respective memory devices to the storage areas of the respective memory devices,
   wherein before the page temporary storage area programming step is performed, the data transmitted to the page temporary storage areas of the respective memory devices are temporarily stored in the page temporary storage areas.

7. The memory storage device according to claim 6, wherein the page temporary storage areas of the memory devices comprise page temporary storage reserved areas and page temporary storage data areas, respectively,
   wherein the controller first transmits data which are intended to be read from the storage areas of the respective memory devices, to the page temporary storage data areas of the respective memory devices, and then transmits the data to the buffer area, and
   the controller transmits data which are to be written to the corresponding memory device among the data of the buffer area, to the page temporary storage reserved areas.

8. The memory storage device according to claim 6, wherein the controller comprises at least one static random access memory (SRAM) set as the buffer area.

9. The memory storage device according to claim 8, wherein the SRAM set corresponds to two or more memory devices.

10. The memory storage device according to claim 8, wherein the buffer area comprises a storage space having a size of two plane pages.

11. The memory storage device according to claim 6, wherein the storage area of each of the memory devices includes one of a single level cell (SLC), a multi-level cell (MLC), a triple level cell (TLC) and combinations thereof.

12. The memory storage device according to claim 6, wherein the memory device includes one of a flash memory, a ferroelectric random access memory (RAM), a magneto-resistive RAM, an electro-resistive RAM, a phase-change RAM and combinations thereof.

* * * * *